UNITED STATES PATENT OFFICE.

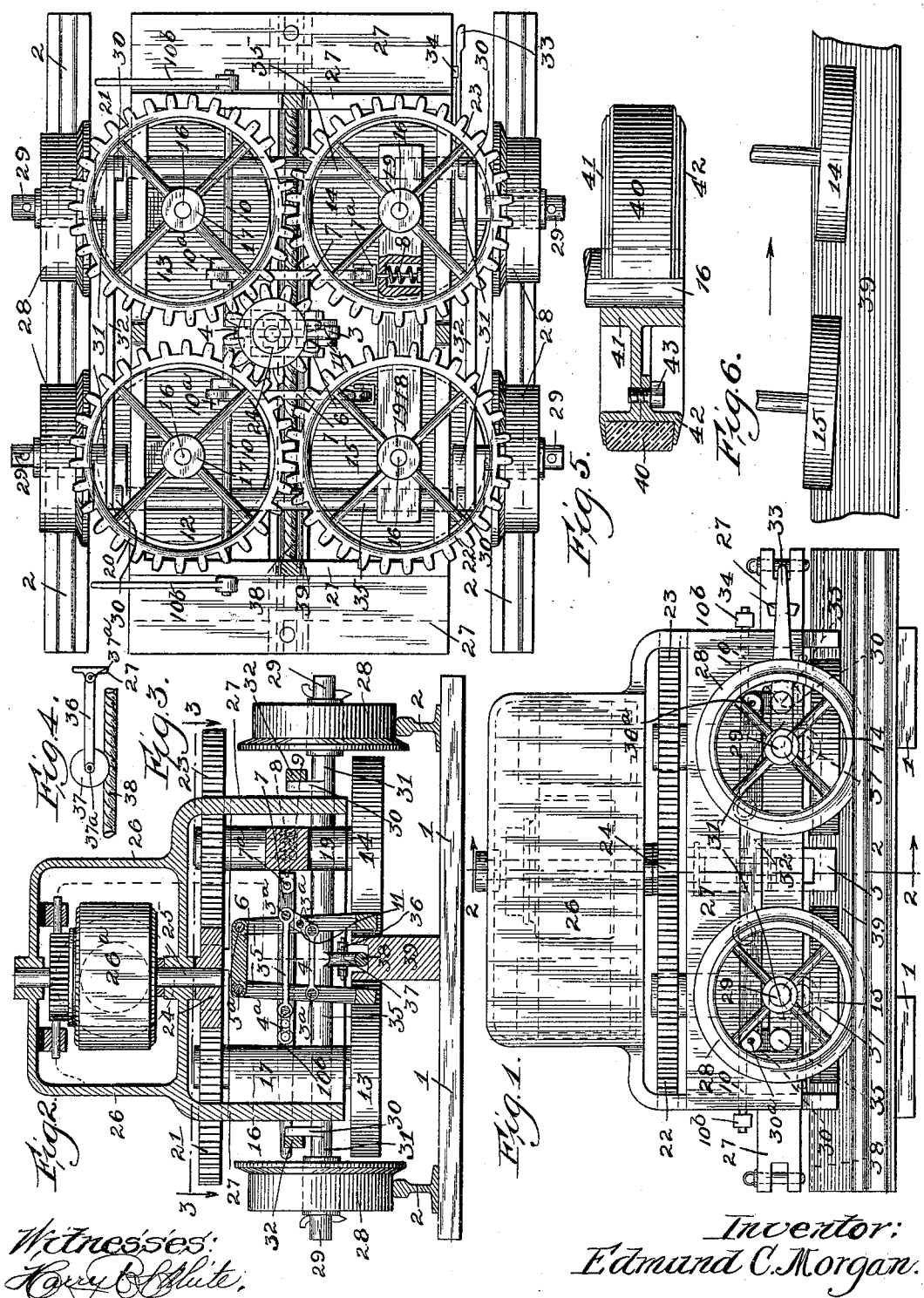

EDMUND C. MORGAN, OF CHICAGO, ILLINOIS, ASSIGNOR TO THE ELECTRIC HAULAGE AND MANUFACTURING COMPANY, OF BRAZIL, INDIANA.

ELECTRIC RAILWAY.

SPECIFICATION forming part of Letters Patent No. 645,646, dated March 20, 1900.

Application filed September 2, 1898. Serial No. 690,082. (No model.)

*To all whom it may concern:*

Be it known that I, EDMUND C. MORGAN, a citizen of the United States, residing at Chicago, in the county of Cook and State of Illinois, have invented a new and useful Electric Railway, of which the following is a specification.

My invention relates to that class of electric railways in which the propelling power is obtained by means of electric current obtained from a conductor laid parallel with the track; and the object of the invention is to provide a simple, efficient, and safe transportation system which is more especially intended for use in mines where in many cases the rails are light and the grades are steep and the space is small. It may, however, be used to advantage for many other purposes.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the various views and reference-signs appearing thereon, Figure 1 is a side view of an electric railway embodying the principles of my invention. Fig. 2 is a vertical central transverse sectional view of same on the line 2 2, Fig. 1. Fig. 3 is a sectional plan view of the same, taken on the line 3 3, Fig. 2. Fig. 4 is a separate view of the trolley-wheel and trolley-arm. Fig. 5 is a view, partly in section, of a traction-wheel. Fig. 6 is a diagrammatic view of the traction-wheels and supplemental rail, serving to show the operation of a part of the invention.

The same part is designated by the same reference-sign wherever it occurs throughout the several views.

The ties 1 1 and the rails 2 2, Figs. 1, 2, and 3, constitute a track of ordinary and well-known construction. Fastened to the ties 1 1, preferably centrally between the rails 2 2, is what I will term a "supplemental" rail 39, which I prefer to make of wood or some other insulating material; but it may be faced with metal at the sides, if desired. At the top of the supplemental rail a groove is formed and an electric conductor 38 placed therein, the groove being deep enough so that the top of the conductor will lie below the top surface of the supplemental rail. The conductor may, if desired, be secured to the supplemental rail by means of staples or other suitable fastening devices.

Reference-sign 27, Figs. 1, 2, and 3, indicates a truck which is mounted on four flanged wheels 28, Figs. 1, 2, and 3. These flanged wheels are of usual construction and are arranged to run on the rails 2 2. The wheels 28 are journaled on axles 29, which are secured to cranks 31. These cranks are secured to shafts 35. Extending from the cranks are arms 30, which are connected together lengthwise of the truck by connecting-rods 32. A suitable lever 33 extends from one of the cranks and is held in any desired position by the keeper 34, all of which is shown clearly in Figs. 1 and 3 and partly in Fig. 2.

In the frame 27 the vertical shafts 16 are mounted in suitable bearings 17 and 19. The bearings 17 are secured directly to the frame 27, and the bearings 19 are secured to the frame 27 by means of the cross-head 18, which is provided with suitable bearings adapted to receive the shafts 35, the bearings being such as to allow the cross-head 18 to slide along the shafts 35. Secured to the shafts 16 at their lower ends are the traction-wheels 12 13 14 15 and at the upper ends are secured the gear-wheels 20 21 22 23. The traction-wheels 12 and 13 are arranged to engage the supplemental rail 39 at one side and the traction-wheels 14 and 15 are arranged to engage the supplemental rail at the opposite side. The gear-wheel 20 meshes with the gear-wheel 22 and the gear-wheel 21 meshes with the gear-wheel 23. The teeth of these gear-wheels are made long enough so that the gear-wheels 22 and 23 may be moved away from the gear-wheels 20 and 21 the desired distance without getting out of mesh. Secured to the truck by suitable bearings is a shaft 10, having cranks $10^a$ and crank $4^a$ formed in it and having levers $10^b$ secured to it. The cranks $10^a$ are connected to the cross-head 18 by means of connecting-rods 7, eyebolts $7^a$, and springs 8. Secured to the truck 27 by pivots $5^a$, Fig. 2, at their upper ends are brake-arms 5, which are arranged so that their lower ends may bear on the supplemental rail, one at each side. A lever 11 is pivoted in brake-arm by means of a suitable pin, as 3ª. A connecting-rod 3 connects one end of the lever 11 to the crank 4ª on shaft 10. The other end of the lever 11 is connected to the brake-arm by means of connecting-rod 4.

Carried by the truck 27 is an electric motor 26, Figs. 1 and 2, of usual construction, and secured to the motor-shaft 25, at its lower end, is a gear-wheel 24, arranged to mesh with gear-wheels 20 and 21, as clearly shown in Fig. 3.

Reference-sign 37, Figs. 1 and 2 and separate view Fig. 4, shows a trolley-wheel which is carried by the trolley-arm 36, which is pivoted to the truck 27 by pin 37ª, Fig. 4, and arranged to bear on the electric conductor 38. The trolley-wheel is made of electric conducting material and is electrically connected to the motor 26 by any convenient and well-known means. The return-circuit for the current is preferably formed by the rails 2 2 in the usual way.

Fig. 5 shows the form of traction-wheel I prefer to use. It consists of an elastic tire 40, which is placed on the flanged disk wheel 41 and held in place by flanged ring 42 and screw 43. The elastic tire secures flexibility and a good grip on the supplemental rail.

I will now describe the operation of my invention. The traction-wheels 12 13 14 15 being revolved by means of the electric motor, when brought into engagement with the supplemental rail 39 by moving the levers 10ᵇ in one direction will cause the truck to move along the track, and when the levers 10ᵇ are moved in the opposite direction the traction-wheels are first brought out of engagement with the supplemental rail. A further movement of the levers 10ᵇ causes the brake-arms 5 to come in contact with the supplemental rail and bring the truck to rest. The truck will move in either direction along the track by changing the direction of rotation of the motor. The movement of the lever 33 in either direction out of central position will cause one end of the truck to be raised and the other end to be lowered. This will cause the traction-wheels to assume an angle in relation to the supplemental rail. (Shown very clearly in Fig. 6.) The object of this is to prevent the traction-wheels from climbing on the supplemental rail. The traction-wheels being given a downward pitch in the direction the truck is moving will cause the truck-wheels to hug the track.

While I have shown and described a specific construction and arrangement of parts as illustrative embodiments of my invention, it will be understood that many changes and alterations would readily suggest themselves to persons skilled in the art and still fall within the spirit and scope of my invention. I do not desire, therefore, to be limited to the exact details of construction and arrangement shown and described; but, Having now explained the object and nature of my invention and a form of apparatus embodying the same and having explained the construction, function, and mode of operation thereof, what I claim as new and useful and of my own invention, and desire to secure by Letters Patent, is—

1. In an electric railway, a track, a truck mounted thereon, feed-wheels carried by said truck, a supplemental rail arranged to be engaged by said wheels to move the truck along said track, a motor for rotating said wheels, and means for varying the angle of contact of said wheels with said supplemental rail, as and for the purpose set forth.

2. In an electric railway, a track, a truck mounted thereon, a motor carried by said truck, a pair of feed-wheels arranged to be actuated by said motor, in combination with a supplemental rail, the members of said pair of wheels arranged respectively on opposite sides of said rail to grip the same between them, and means for varying the angle of inclination of said wheels with respect to the supplemental rail, as and for the purpose set forth.

3. In an electric railway, a truck, crank-arms mounted therein, supporting-wheels journaled upon said crank-arms, and track-rails upon which said wheels operate, in combination with a supplemental rail, feed-wheels arranged to grip said rail, a motor for actuating said feed-wheels, and means for rocking said crank-arms whereby the angle of inclination of said feed-wheels with reference to said supplemental rail may be varied, as and for the purpose set forth.

4. In an electric railway, a truck, a rock-shaft mounted therein and having cranks, supporting-wheels journaled upon said cranks, and track-rails upon which said wheels operate, in combination with a supplemental rail, feed-wheels arranged to grip said supplemental rail, a motor for actuating said feed-wheels, and means for rocking said shaft, as and for the purpose set forth.

5. In an electric railway, a truck, supporting-wheels therefor, and a track upon which said wheels are mounted, in combination with a supplemental rail having a longitudinal groove or channel, an electric conductor arranged in said groove or channel, an electric motor carried by said truck, a contact device for conveying current from said conductor to said motor, and means actuated by said motor for engaging said supplemental rail, whereby said truck is moved along the track, as and for the purpose set forth.

6. In an electric railway, a truck, a track upon which said truck is mounted, a supplemental rail having a longitudinal groove or channel, an electric conductor arranged in said groove or channel so as to lie beneath or within the surface of said rail, an electric motor carried by the truck, a contact device for conveying current from the conductor to the motor, feed-wheels carried by the truck and arranged to grip said supplemental rail, and gearing actuated by the motor for rotating said wheels, as and for the purpose set forth.

7. In an electric railway, a truck, an electric motor carried by said truck, a supplemental rail of insulating material having a groove or seat formed longitudinally therein, a conductor seated in said groove so as to lie beneath or within the surface of said rail, a contact device carried by the truck and arranged to extend into said groove or seat to make contact with said conductor, whereby the circuit of said motor is completed, and feed-wheels carried by said truck and arranged on opposite sides of said supplemental rail to grip the same between them, said feed-wheels having resilient engaging surfaces, as and for the purpose set forth.

8. In an electric railway, a truck, a track upon which said truck operates, a supplemental rail, a motor carried by the truck, feed-wheels carried by the truck and actuated by said motor, for engaging said rail, whereby the truck is moved, a conductor carried by said supplemental rail, and means carried by the truck for contacting with said conductor to complete the motor-circuit, and a brake carried by the truck and adapted to be thrown into or out of contact with said rail, as and for the purpose set forth.

9. In an electric railway, a track, a truck, supporting-wheels therefor, said wheels mounted on said track, a third or traction rail, gripping-rolls arranged in pairs, the members of each pair being respectively arranged on opposite sides of said rail, and adapted to grip said rail between them, swinging arms in which said wheels are mounted, means for simultaneously swinging all of said arms toward or away from said rail, and a motor for positively rotating said wheels, said third rail being grooved or channeled, and carrying a conductor in said groove or channel for supplying current to said motor, as and for the purpose set forth.

EDMUND C. MORGAN.

Witnesses:
   GEO. T. KNOX,
   EDWARD W. GRIFFITH.